US012705856B2

(12) United States Patent
Hatamizadeh et al.

(10) Patent No.: US 12,705,856 B2
(45) Date of Patent: Aug. 11, 2026

(54) GLOBAL CONTEXT VISION TRANSFORMER

(71) Applicant: NVIDIA Corporation, Santa Clara, CA (US)

(72) Inventors: Ali Hatamizadeh, Los Angeles, CA (US); Pavlo Molchanov, Mountain View, CA (US); Hongxu Yin, San Jose, CA (US); Jan Kautz, Lexington, MA (US)

(73) Assignee: NVIDIA CORPORATION, Santa Clara, CA (US)

( * ) Notice: Subject to any disclaimer, the term of this patent is extended or adjusted under 35 U.S.C. 154(b) by 444 days.

(21) Appl. No.: 18/083,397

(22) Filed: Dec. 16, 2022

(65) Prior Publication Data

US 2023/0394781 A1 Dec. 7, 2023

Related U.S. Application Data

(60) Provisional application No. 63/347,932, filed on Jun. 1, 2022.

(51) Int. Cl.

| | |
|---|---|
| ***G06V 10/42*** | (2022.01) |
| ***G06T 3/40*** | (2024.01) |
| ***G06V 10/44*** | (2022.01) |
| ***G06V 10/77*** | (2022.01) |
| ***G06V 10/82*** | (2022.01) |

(52) U.S. Cl.
CPC ................ *G06V 10/42* (2022.01); *G06T 3/40* (2013.01); *G06V 10/44* (2022.01); *G06V 10/7715* (2022.01); *G06V 10/82* (2022.01)

(58) Field of Classification Search
CPC .... G06V 10/42; G06V 10/44; G06V 10/7715; G06V 10/82; G06V 10/40; G06V 10/422; G06V 10/806; G06V 10/454; G06V 10/77; G06T 3/40; G06T 3/4046; G06T 2207/20084; G06N 3/02; G06N 3/04; G06N 3/045; G06N 3/0464; G06N 3/044
See application file for complete search history.

(56) References Cited

U.S. PATENT DOCUMENTS

| | | | | |
|---|---|---|---|---|
| 11,250,314 | B2 * | 2/2022 | Meyerson .............. | G06N 3/048 |
| 2020/0160124 | A1 * | 5/2020 | Fu ........................ | G06V 10/764 |

(Continued)

OTHER PUBLICATIONS

Liu, Ze et al. "Swin Transformer: Hierarchical Vision Transformer using Shifted Windows", Oct. 17, 2021 [retrieved on Mar. 20, 2025], 2021 IEEE/CVF ICCV [online], 2021, pp. 9992-10002. Retrieved from IEEE Xplore: URL :< https://ieeexplore.ieee.org/document/9710580>. (Year: 2021).*

(Continued)

*Primary Examiner* — Matthew C Bella
*Assistant Examiner* — Nicholas John Helco
(74) *Attorney, Agent, or Firm* — Zilka-Kotab, P.C.

(57) ABSTRACT

Vision transformers are deep learning models that employ a self-attention mechanism to obtain feature representations for an input image. To date, the configuration of vision transformers has limited the self-attention computation to a local window of the input image, such that short-range dependencies are modeled in the output. The present disclosure provides a vision transformer that captures global context, and that is therefore able to model long-range dependencies in its output.

22 Claims, 15 Drawing Sheets

Local attention

Global Attention

(56) References Cited

U.S. PATENT DOCUMENTS

2021/0383191 A1* 12/2021 Ainslie ................ G06N 3/0455
2022/0207321 A1* 6/2022 Gulati ...................... G06N 3/04
2023/0386197 A1* 11/2023 Chen ...................... G06V 10/82
2025/0022269 A1* 1/2025 Li ........................ G06N 3/0499

OTHER PUBLICATIONS

[Item U continued] doi:<10.1109/ICCV48922.2021.00986>. (Year: 2021).*
Pan, Junting et al. "EdgeViTs: Competing Light-weight CNNs on Mobile Devices with Vision Transformers", May 6, 2022 [retrieved on Mar. 20, 2025]. Retrieved from arXiv: URL: <https://arxiv.org/abs/2205.03436v1>. doi:<10.48550/arXiv.2205.03436>. (Year: 2022).*
Patel, Krushi et al. "Aggregating Global Features into Local Vision Transformer", Jan. 30, 2022 [retrieved on Mar. 21, 2025]. Retrieved from arXiv: URL: <https://arxiv.org/abs/2201.12903>. doi: <https://doi.org/10.48550/arXiv.2201.12903>. (Year: 2022).*
Pan, Junting et al. "EdgeViTs: Competing Light-weight CNNs on Mobile Devices with Vision Transformers", May 6, 2022. Retrieved from arXiv: URL: <https://arxiv.org/abs/2205.03436v1>. (Year: 2022).*
Patel, Krushi et al. "Aggregating Global Features into Local Vision Transformer", Jan. 30, 2022. Retrieved from arXiv: URL: <https://arxiv.org/abs/2201.12903>. (Year: 2022).*
Park, GyuTae et al. "MatteFormer: Transformer-Based Image Matting via Prior-Tokens", Mar. 29, 2022. Retrieved from arXiv: <URL: https://doi.org/10.48550/arXiv.2203.15662>. (Year: 2022).*
Vaswani et al. "Attention is all you Need," 31st Conference on Neural Information Processing Systems, 2017, pp. 1-11.
Yin et al., "A-VIT: Adaptive Tokens for Efficient Vision Transformer," CVPR, 2022, pp. 10809-10818.
Dosovitskiy et al., "An image is worth 16x16 words: Transformers for image recognition at scale," International Conference on Learning Representations, 2021, pp. 1-21.
Raghu et al., "Do Vision Transformers See Like Convolutional Neural Networks?" 35th Conference on Neural Information Processing Systems, 2021, pp. 1-13.
Yang et al., "NVIT: Vision transformer compression and parameter redistribution," arXiv, 2021, pp. 1-18, retrieved from https://arxiv.org/abs/2110.04869.
Liu et al., "Swin transformer: Hierarchical vision transformer using shifted windows," Proceedings of the IEEE/CVF International Conference on Computer Vision, 2021, pp. 10012-10022.
Dong et al., "CSWin Transformer: A General Vision Transformer Backbone with Cross-Shaped Windows." arXiv, 2021, 15 pages, retrieved from https://arxiv.org/pdf/2107.00652v2.pdf.
Chu et al., "Twins: Revisiting the Design of Spatial Attention in Vision Transformers," arXiv, 2021, 14 pages, retrieved from https://arxiv.org/pdf/2104.13840.pdf.
Tu et al., "MaxViT: Multi-Axis Vision Transformer," arXiv, 2022, 31 pages, retrieved from https://arxiv.org/pdf/2204.01697.pdf.
Yang et al., "Focal Attention for Long-Range Interactions in Vision Transformers," 35th Conference on Neural Information Processing Systems, 2021, pp. 1-15.
Liu et al., "A ConvNet for the 2020s," arXiv, 2022, 15 pages, retrieved from https://arxiv.org/abs/2201.03545.
He et al., "Mask R-CNN," Proceedings of the IEEE International Conference on Computer Vision, 2017, pp. 2961-2969.
Xiao et al., "Unified Perceptual Parsing for Scene Understanding," ECCV, 2018, pp. 1-17.
Wang et al., "PVT v2: Improved baselines with Pyramid Vision Transformer," Computational Visual Media, vol. 8, No. 3, Sep. 2022, pp. 415-424.
Tan et al., "EfficientNetV2: Smaller Models and Faster Training," Proceedings of the 38 th International Conference on Machine Learning, PMLR, 2021, 11 pages.
Hu et al., "Squeeze-and-Excitation Networks," Proceedings of the IEEE Conference on Computer Vision and Pattern Recognition, 2018, pp. 7132-7141, retrieved from https://openaccess.thecvf.com/content_cvpr_2018/papers/Hu_Squeeze-and-Excitation_Networks_CVPR_2018_paper.pdf.
Hendrycks et al., "Gaussian Error Linear Units (gelus)," arXiv, 2020, 9 pages, retrieved from https://arxiv.org/ pdf/1606.08415.pdf.
Hu et al., "Relation Networks for Object Detection," Proceedings of the IEEE Conference on Computer Vision and Pattern Recognition, 2018, pp. 3588-3597, retrieved from https://openaccess.thecvf.com/content_cvpr_2018/papers/Hu_Relation_Networks_for_CVPR_2018_paper.pdf.
Touvron et al., "Training data-efficient image transformers & distillation through attention," Proceedings of the 38 th International Conference on Machine Learning, PMLR, vol. 139, 2021, 11 pages.
Graham et al., "LeViT: a Vision Transformer in ConvNet's Clothing for Faster Inference," Proceedings of the IEEE/CVF International Conference on Computer Vision, 2021, pp. 12259-12269, retrieved from https://openaccess.thecvf.com/content/ICCV2021/papers/Graham_LeVIT_A_Vision_Transformer_in_ConvNets_Clothing_for_Faster_Inference_ICCV_2021_paper.pdf.
El-Nouby et al., "XCIT: Cross-Covariance Image Transformers," 35th Conference on Neural Information Processing Systems (NeurIPS), 2021, pp. 1-14.
Wu et al., "CvT: Introducing Convolutions to Vision Transformers," Proceedings of the IEEE/CVF International Conference on Computer Vision (ICCV), 2021, pp. 22-31.
Chu et al., "Conditional positional encodings for vision transformers," arXiv, 2021, 13 pages, retrieved from https://arxiv.org/pdf/2102.10882v2.pdf.
Yuan et al., "Tokens-to-Token ViT: Training Vision Transformers from Scratch on ImageNet," ICCV, 2021, pp. 558-567, retrieved from https://openaccess.thecvf.com/content/ICCV2021/papers/Yuan_Tokens-to-Token_ViT_Training_Vision_Transformers_From_Scratch_on_ImageNet_ICCV_2021_paper.pdf.
Wang et al., "Pyramid Vision Transformer: A Versatile Backbone for Dense Prediction without Convolutions," Proceedings of the IEEE/CVF International Conference on Computer Vision, 2021, pp. 568-578, retrieved from https://openaccess.thecvf.com/content/ICCV2021/papers/Wang_Pyramid_Vision_Transformer_A_Versatile_Backbone_for_Dense_Prediction_Without_ICCV_2021_paper.pdf.
Krizhevsky et al., "ImageNet Classification with Deep Convolutional Neural Networks," In Advances in Neural Information Processing Systems, 2012, pp. 1-9, retrieved from https://proceedings.neurips.cc/paper/2012/file/c:399862d3b9d6b76c8436e924a68c45b-Paper.pdf.
Simonyan et al., "Very Deep Convolutional Networks for Large-Scale Image Recognition," International Conference on Learning Representations, 2015, pp. 1-14.
Howard et al., "MobileNets: Efficient Convolutional Neural Networks for Mobile Vision Applications," arXiv, 2017, 9 pages, retrieved from https://arxiv.org/pdf/1704.04861.pdf.
He et al., "Deep Residual Learning for Image Recognition," IEEE CVPR, 2016, pp. 770-778, retrieved from https://www.cv-foundation.org./openaccess/content_cvpr_2016/papers/He_Deep_Residual_Learning_CVPR_2016_paper.pdf.
Szegedy et al., "Rethinking the Inception Architecture for Computer Vision," IEE CVPR, 2016, pp. 2818-2826, retrieved from https://www.cv-foundation.org/openaccess/content_cvpr_2016/papers/Szegedy_Rethinking_the_Inception_CVPR_2016_paper.pdf.
Huang et al., "Densely Connected Convolutional Networks," IEEE CVPR, 2017, 9 pages, retrieved from https://openaccess.thecvf.com/content_cvpr_2017/papers/Huang_Densely_Connected_Convolutional_CVPR_2017_paper.pdf.
Trockman et al., "Patches are all you need?" arXiv preprint, 2022, 16 pages, retrieved from https://arxiv.org/pdf/2201.09792.pdf.
Deng et al., "ImageNet: A Large-Scale Hierarchical Image Database," IEEE CVPR, 2009, 8 pages, retrieved from https://www.image-net.org/static_files/papers/imagenet_cvpr09.pdf.
Kingma et al., "Adam: A method for stochastic optimization," arXiv, 2014, pp. 1-9, retrieved from https://arxiv.org/pdf/1412.6980v1.pdf.
Touvron et al., "ResMLP: Feedforward networks for image classification with data-efficient training," arXiv, 2021, 18 pages, retrieved from https://arxiv.org/pdf/2105.03404.pdf.

(56) References Cited

OTHER PUBLICATIONS

Chen et al., "CrossVIT: Cross-Attention Multi-Scale Vision Transformer for Image Classification," IEEE ICCV, 2021, pp. 357-366, retrieved from https://openaccess.thecvf.com/content/ICCV2021/papers/Chen_CrossViT_Cross-Attention_Multi-Scale_Vision_Transformer_for_Image_Classification_ICCV_2021_paper.pdf.
Xie et al., "Aggregated Residual Transformations for Deep Neural Networks," IEEE CVPR, 2017, pp. 1492-1500, retrieved from https://openaccess.thecvf.com/content_cvpr_2017/papers/Xie_Aggregated_Residual_Transformations_CVPR_2017_paper.pdf.
Lin et al., "Microsoft COCO: Common Objects in Context," ECCV, 2014, pp. 740-755.
Zhou et al., "Scene Parsing through ADE20K Dataset," IEEE CVPR, 2017, pp. 633-641, retrieved from https://openaccess.thecvf.com/content_cvpr_2017/papers/Zhou_Scene_Parsing_Through_CVPR_2017_paper.pdf.
Chen et al., "MMDetection: Open MMLab Detection Toolbox and Benchmark," arXiv, 2019, 13 pages, retrieved from https://arxiv.org/pdf/1906.07155.pdf.
Wightman, R., "PyTorch Image Models," GitHub, 2020, 17 pages, retrieved from https://web.archive.org/web/20200429020541/https:/github.com/rwightman/pytorch-image-models/.
GitHub, "MMSegmentation," GitHub, 2020, 5 pages, retrieved from https://web.archive.org/web/20201111082641/https://github.com/open-mmlab/mmsegmentation.

* cited by examiner

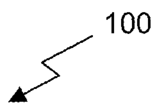

processing an input image through at least one stage of a vision transformer to obtain feature representations for the input image, each stage in the at least one stage including:

a global self-attention module that accesses, per local window of a plurality of local windows within the input image, global features extracted from least a portion of the input image outside of the local window, and a local self-attention module that extracts, per local window of the plurality of local windows within the input image, local features from the local window

102 outputting the feature representations

Local MSA

GLOBAL CONTEXT VISION TRANSFORMER

CLAIM OF PRIORITY

This application claims the benefit of U.S. Provisional Application No. 63/347,932 titled "GLOBAL CONTEXT MODEL FOR TRANSFORMER NEURAL NETWORKS," filed Jun. 1, 2022, the entire contents of which is incorporated herein by reference.

TECHNICAL FIELD

The present disclosure relates to vision transformers that perform image processing.

BACKGROUND

In the realm of computer systems, transformers have been developed to provide computer vision tasks, in which various meaningful information (e.g. classification, object detection, etc.) is derived from digital images or video. In general, a transformer is a deep learning model that employs self-attention in which the context of an input is considered when generating an output. Originally, transformers were limited to a fixed resolution architecture, and thus did not adapt well for use with higher resolution applications.

As an improvement to traditional transformers, vision transformers have been developed to include a hierarchical architecture, which allows for a reduction in resolution while processing image patches per local window of the image. However, computing self-attention within a local window of image patches limits the context in which an image patch is processed. In order to cross-interact with other regions (non-local windows) of the image, the windows must be shifted and the self-attention recomputed, which is computationally expensive.

There is a need for addressing these issues and/or other issues associated with the prior art. For example, there is a need for vision transformers to be able to capture long-range spatial dependencies in a less computationally expensive manner.

SUMMARY

In an embodiment, a method, computer readable medium, and system are disclosed for providing global context in a vision transformer. An input image is processed through at least one stage of a vision transformer to obtain feature representations for the input image. With respect to the present embodiment, each stage in the at least one stage includes a global self-attention module that accesses, per local window of a plurality of local windows within the input image, global features extracted from at least a portion of the input image outside of the local window. With respect to the present embodiment, each stage in the at least one stage also includes a local self-attention module that extracts, per local window of the plurality of local windows within the image, local features from the local window. The feature representations are subsequently output.

In another embodiment, an input image is processed through at least one stage of a vision transformer to obtain feature representations for the input image. With respect to the present embodiment, each stage in the at least one stage includes a global self-attention module that accesses, per local window of a plurality of local windows within the input image, global features extracted from at least a portion of the input image outside of the local window. The feature representations are subsequently output.

In another embodiment, a method, computer readable medium, and system are disclosed for generating global query tokens for use in providing global context with a vision transformer. A feature map generated for an image is identified. The feature map is processed, using a vision transformer, to generate global query tokens that spatially correspond with local tokens of each local window of a plurality of local windows within the image. The local tokens in each local window of the plurality of local windows attend to their corresponding global query tokens.

BRIEF DESCRIPTION OF THE DRAWINGS

FIG. 1A illustrates a flowchart of a method for providing global context in a vision transformer, in accordance with an embodiment.

DETAILED DESCRIPTION

Figure 1B:
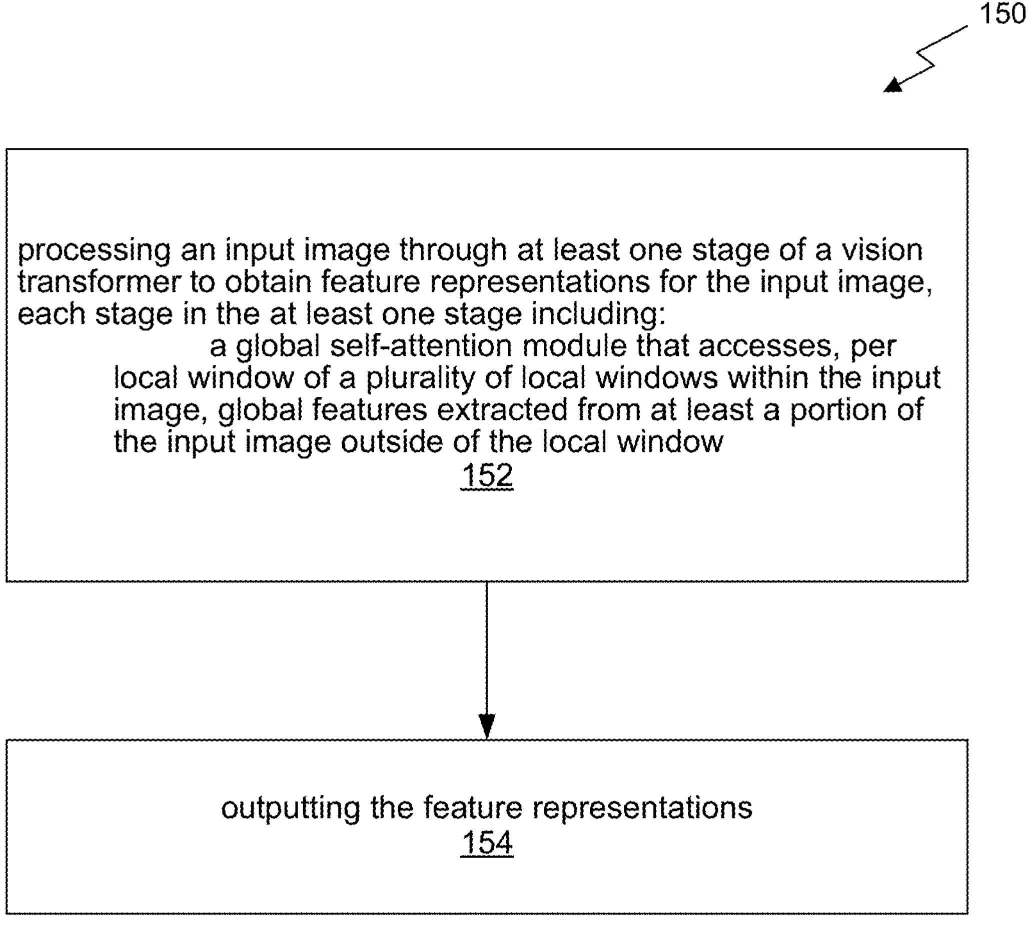
FIG. 1B illustrates a flowchart of a method for providing global self-attention in a vision transformer, in accordance with an embodiment.

The embodiments disclosed herein relate to a vision transformer (e.g. neural network, deep learning model) that is configured to process images, using both local and global self-attention, to derive information from those images. As disclosed herein, the information derived by the vision transformer may be feature representations for an input image. The derived information may then be provided, as input embeddings, to a computer vision-related downstream task. The downstream task can then process the given input to provide, for example, image classification, object detection, instance segmentation, semantic segmentation, or other computer vision-related information for the input image.

In the context of the present description, self-attention generally refers to processing (e.g. comparing) every input in a set of inputs with respect to every other input in the set, including itself, and weighing/reweighing the embeddings of each input to include the determined contextual relevance (i.e. the relevance of the set of inputs to the given input's own meaning in the set). With respect to the present description, the self-attention computation operates to determine feature representations for the input image.

To this end, with respect to the present embodiments, local self-attention refers to the self-attention computed for an input with respect to other inputs in its local window (e.g. region), whereas global self-attention refers to the self-attention computed for an input with respect to global information derived from an entirety of the image (i.e. the image as a whole), or at least from a portion of the image outside of the input's local window. By computing both local and global self-attention during image processing, short-range and long-range spatial dependencies may be respectively modeled by the vision transformer, which improves the quality of the feature representations obtained by the vision transformer.

FIG. 1A illustrates a flowchart of a method 100 for providing global context in a vision transformer, in accordance with an embodiment. The method 100 may be performed by a device comprised of a processing unit, a program, custom circuitry, or a combination thereof.

In operation 102, an input image is processed through at least one stage of a vision transformer to obtain feature representations for the input image. The input image refers to a digital image, which may be captured using a digital camera or generated using a computer application. The input image may be retrieved from computer memory, or may otherwise be received from a computer process, for being processed by the vision transformer.

The input image is apportioned into a plurality of local windows. Each of the local windows includes a plurality of image patches, which may be blocks or other image portions each composed of one or more pixels or other image elements. In an embodiment, the image patches within each local window overlap (i.e. adjacent image patches may have overlapping edges to some defined degree). In another embodiment, the image patches within each local window do not overlap.

As mentioned above, the input image is processed through at least one stage of the vision transformer. With respect to the present description, each stage refers to a processing stage, as defined herein, that obtains feature representations for the input image. In an embodiment, the at least one stage may be only a single stage. In another embodiment, the at least one stage may be two or more stages, for example that operate in sequence.

With respect to the present embodiment, each stage in the at least one stage includes a local self-attention module (e.g. component, code block, etc.) that extracts, per local window of a plurality of local windows within the input image, local features from the local window. The local features may be of any defined category (e.g. textures, shape descriptors, etc.), and refer to features extracted from the local window only.

In an embodiment, the local self-attention module captures local interactions for each image patch within the local window. In an embodiment, the self-attention module computes local query, key, and value tokens for each image patch within the local window, and then captures the local interactions using further computations applied to those local query, key, and value tokens.

Also with respect to the present embodiment, each stage in the at least one stage includes a global self-attention module that accesses, per local window of the plurality of local windows within the input image, global features extracted from an entirety of the input image, or from at least a portion of the input image outside of the local window. The global features may be of any defined category (e.g. textures, shape descriptors, etc.), and refer to features extracted from locations within the input image that are at least partially outside of the local window.

In an embodiment, a feature map for the entirety of the image may be created, and the global features may be extracted from that feature map. In an embodiment, the global features may be key features detected within the input image. In an embodiment, the global features may be extracted from the entirety of the input image by a global token generator of the vision transformer. In an embodiment, the global token generator may be a convolutional neural network (CNN)-like module that extracts the global features only once at every stage in the at least one stage. The global token generator will be described in more detail below.

In an embodiment, the global self-attention module accesses the global features for interaction with each image patch within the local window. For example, the global features may be used as a global query token which interacts with local key and value tokens computed by the global self-attention module for each image patch within the local window (i.e. using further computations applied to the global query token and local query and key tokens).

In this way, for each local window and each stage of the vision transformer, local and global self-attention may be computed for the input image. Likewise, for each local window and each of a plurality of (e.g. sequential) stages of the vision transformer, local and global self-attention may be computed for the input image. In an embodiment, each stage, or each of the plurality of stages, of the vision transformer outputs features representations for the input image. In an embodiment with a plurality of stages, a spatial resolution may be decreased after one or more of the stages of the vision transformer. For example, the spatial resolution may be decreased after each of the plurality of stages of the vision transformer, with optionally the exception of the last one of the stages of the vision transformer. In this way, a sequence of stages may have sequentially reduced dimensions. In an embodiment, the spatial resolution may be decreased by a downsampling block of the vision transformer. The downsampling block will be described in more detail below.

In operation 104, the feature representations are output. As mentioned above, the at least one stage of the vision transformer is used to obtain the feature representations for the input image. By employing the global self-attention module and the local self-attention module per stage of the vision transformer, both long-range (global) dependencies and short-range (local) dependencies may be modeled in the output of the vision transformer. In an embodiment, the feature representations may be output as embeddings for the input image.

In an embodiment, the feature representations may be output to one or more further processing blocks of the vision transformer to create such embeddings. These processing blocks may include average pooling and/or linear layers, for example.

In another embodiment, the feature representations may be output to a downstream task, such as a computer vision-related downstream task. In this case, the feature representations may be processed by the downstream task for performing image classification, object detection, instance segmentation, semantic segmentation, or any other desired computer vision-related task for the input image.

FIG. 1B illustrates a flowchart of a method 150 for providing global self-attention in a vision transformer, in accordance with an embodiment. The method 150 may be performed by a device comprised of a processing unit, a program, custom circuitry, or a combination thereof. It should be noted that the definitions provided in the description above may equally apply to the present embodiment.

In operation 152, an input image is processed through at least one stage of a vision transformer to obtain feature representations for the input image. With respect to the present embodiment, each stage in the at least one stage includes a global self-attention module that accesses, per local window of a plurality of local windows within the input image, global features extracted from at least a portion of the input image outside of the local window. Thus, in the present embodiment, each stage in the at least one stage may have the global self-attention module, as described above in FIG. 1A, without having the local self-attention module required in the stage(s) of the embodiment of FIG. 1A.

In operation 154, the feature representations are output. To this end, the vision transformer may operate similar to as described above with reference to FIG. 1A, with the exception that only the global dependencies will be modeled in the output of the vision transformer. For example, in an embodiment, the feature representations may be output to one or more further processing blocks of the vision transformer to create embeddings. These processing blocks may include average pooling and/or linear layers, for example.

In another exemplary embodiment, the feature representations may be output to a downstream task, such as a computer vision-related downstream task, which may be of a lower-level task than some of the downstream task examples given above with respect to FIG. 1A. For example, the feature representations may be processed by the downstream task for performing image segmentation and/or object detection.

Figure 2:
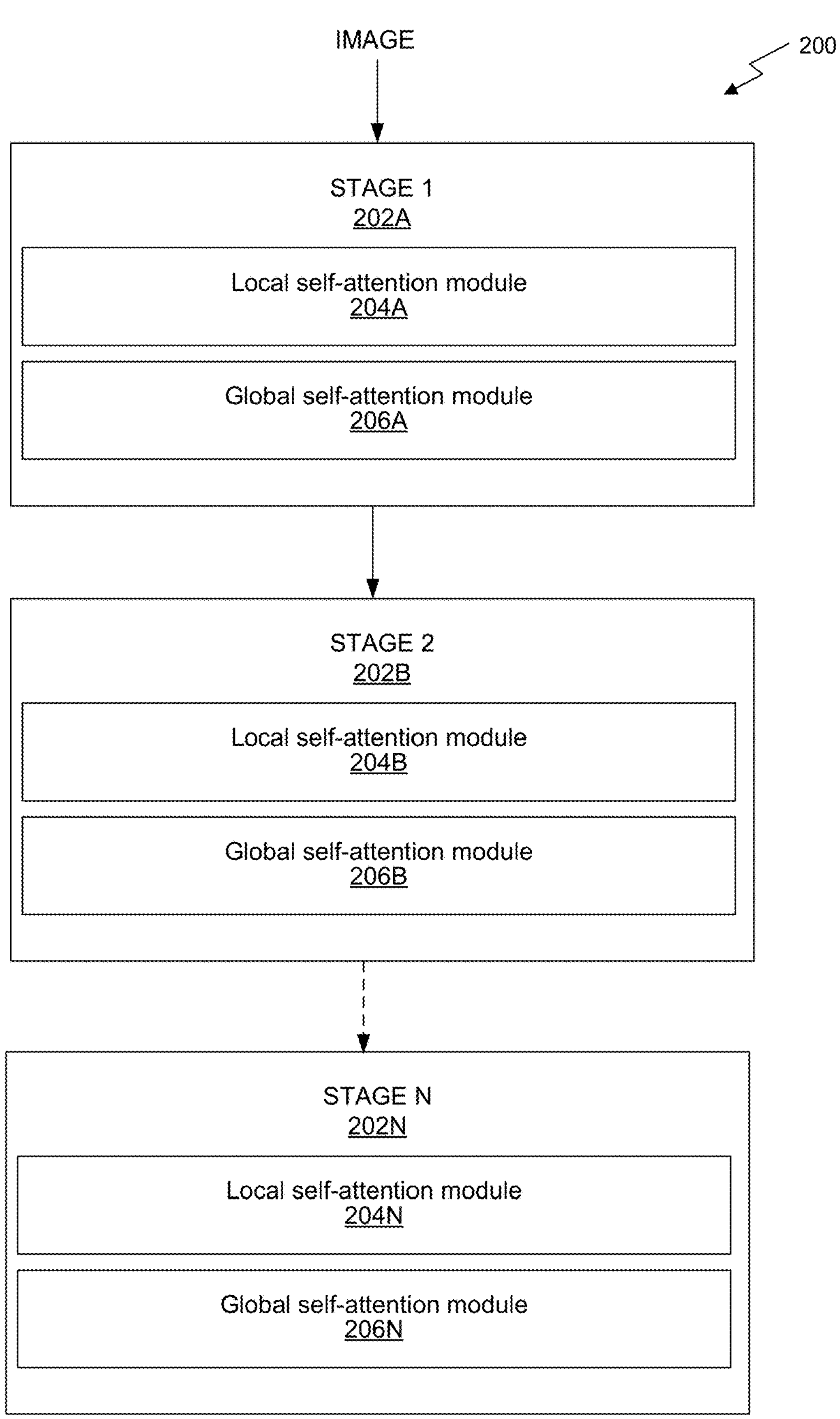
FIG. 2 illustrates a block diagram of a multi-stage architecture of a vision transformer that is configured to provide global context, in accordance with an embodiment.

FIG. 2 illustrates a block diagram of a multi-stage architecture of a vision transformer 200 that is configured to provide global context, in accordance with an embodiment. The vision transformer 200 described herein may be one embodiment of the vision transformer implementing the method 100 of FIG. 1A. Of course, as described above with reference to FIG. 1A, other embodiments are contemplated, although not explicitly shown herein, in which the vision transformer is configured to have only one such processing stage, and thus the description of the present embodiment of the vision transformer 200 could likewise apply to another embodiment of a vision transformer having a single processing stage.

As shown, the vision transformer 200 includes a plurality of stages 202A-N through which an input image is processed to obtain feature representations for the input image. In the present embodiment, the processing stages 202A-N operate sequentially. The final output of the stages 202A-N includes the feature representations of the input image, which may in turn be provided to another processing block of the vision transformer 200 or a computer vision task that is downstream from the vision transformer 200.

In the present embodiment, the image is provided as first input to a first stage 202A of a plurality of stages 202A-N of the vision transformer 200. The first stage 202A processes the first input to generate a first output, and the first output is in turn provided as second input to the second stage 202B of the vision transformer 200 for processing. Likewise, the second stage 202B processes the second input to generate a second output, and the second output is in turn provided as a third input to a third stage (not shown) of the plurality of stages 202A-N for processing. Thus, while the first stage 202A processes the image, each of the subsequent stages 202A-N of the vision transformer 200 process the output of the immediate prior one of the stages 202A-N.

As also shown, each of the stages 202A-N includes both a local self-attention module 204A-N and a global self-attention module 206A-N, as described in detail above with respect to FIG. 1. In this way, each stage 202A-N of the vision transformer 200 may compute both local and global self-attention, per local window of the image.

It should be noted that the vision transformer 200 may include any number of stages 202A-N, as desired. Furthermore, while not shown, the vision transformer 200 may include additional processing blocks situated between one or more of the plurality of stages 202A-N, which for example may include downsampling blocks as described with respect to subsequent figures below.

Figure 3:
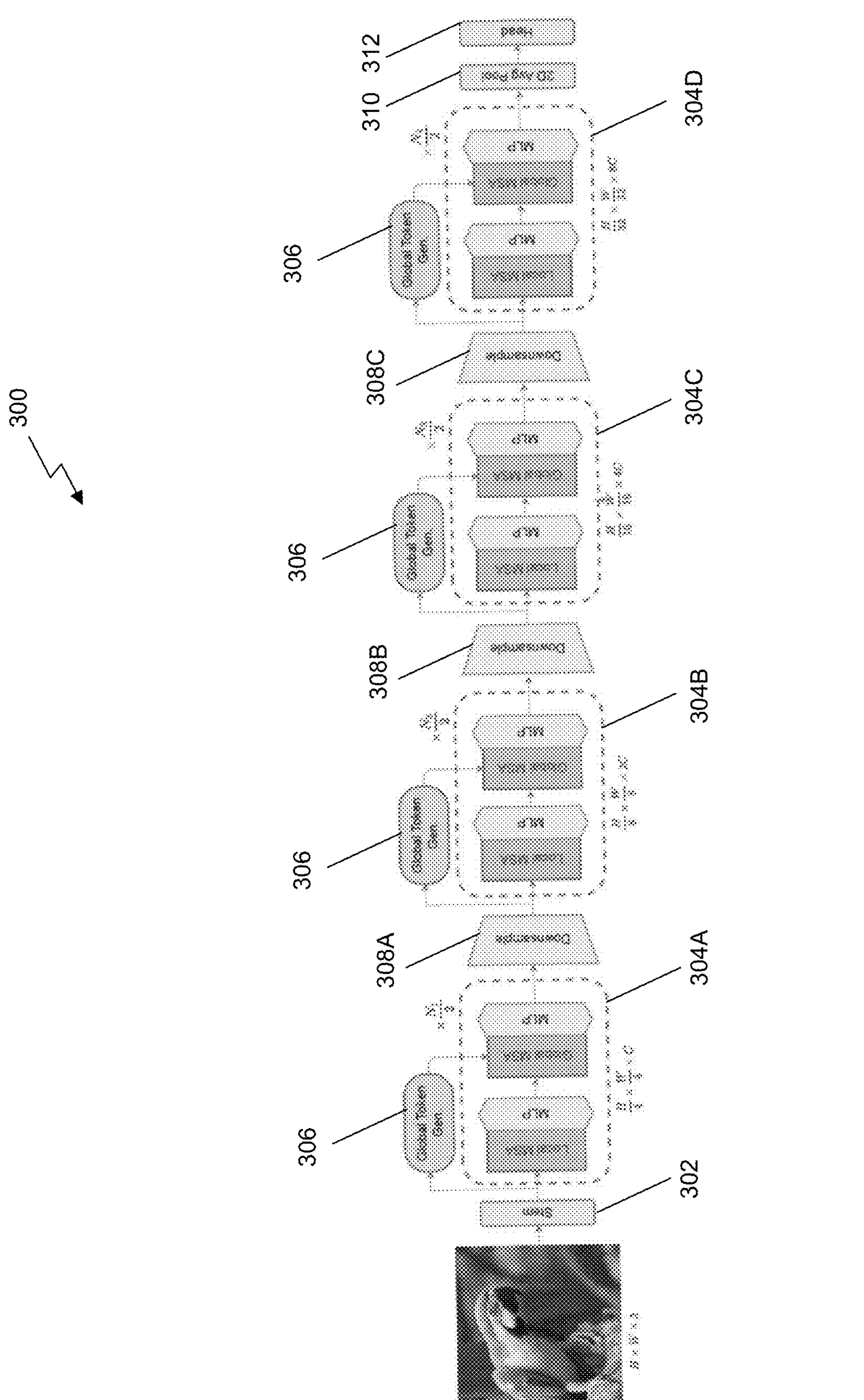
FIG. 3 illustrates a block diagram of a multi-stage architecture of a vision transformer that is configured to provide global context and downsampling, in accordance with an embodiment.

FIG. 3 illustrates a block diagram of a multi-stage architecture of a vision transformer 300 that is configured to provide global context and downsampling, in accordance with an embodiment. The vision transformer 300 described herein may be one embodiment of the vision transformer implementing the method 100 of FIG. 1.

As shown, the vision transformer 300 includes a stem layer 202 to which an image is input. The stem layer 202 obtains image patches for the image and projects those image patches into an embedding space having a defined dimension. In an embodiment where the image has a resolution of $x \in \mathbb{R}^{H \times W \times 3}$, overlapping image patches may be obtained by applying a 3×3 convolutional layer with a stride of 2 and a defined amount of padding. The image patches may then be projected into a C-dimensional embedding space.

The projected image patches are output from the stem layer 202 and processed through a series of stages 304A-D of the vision transformer 300. Each stage 304A-D includes alternating local self-attention and global self-attention modules to extract spatial features. The local self-attention module is composed of a local multi-head self-attention (MSA) layer as well as a corresponding multilayer perceptron (MLP). The global self-attention module is composed of a global MSA and corresponding MLP.

Both local self-attention and global self-attention modules operate in local windows of the image, however, the global self-attention module accesses global features extracted by a global token generator 306. In an embodiment, the global token generator 306 is a CNN-like module that extracts features from the entire image only once at every stage 304A-D. Following each stage 304A-C, with the exception of the final stage 304D, is a downsampling block 308A-C. The downsampling block 308A-C decreases a spatial resolution of the output of the immediate prior stage 304A-C by 2 while increasing a number of channels.

Thus, the configuration of the processing stages 304A-D and the downsampling blocks 308A-C, as described above, may provide a hierarchical architecture for the vision transformer 300, in which feature representations are obtained at several resolutions (one per stage 304A-D) by decreasing the spatial dimensions while expanding the embedding dimension (e.g. by factors of 2 and 2, respectively, in an embodiment). Resulting features output from the final stage 304D are passed through an average pooling layer 310 and then a linear layer 312 to create an embedding for a downstream task (not shown).

Figure 4:
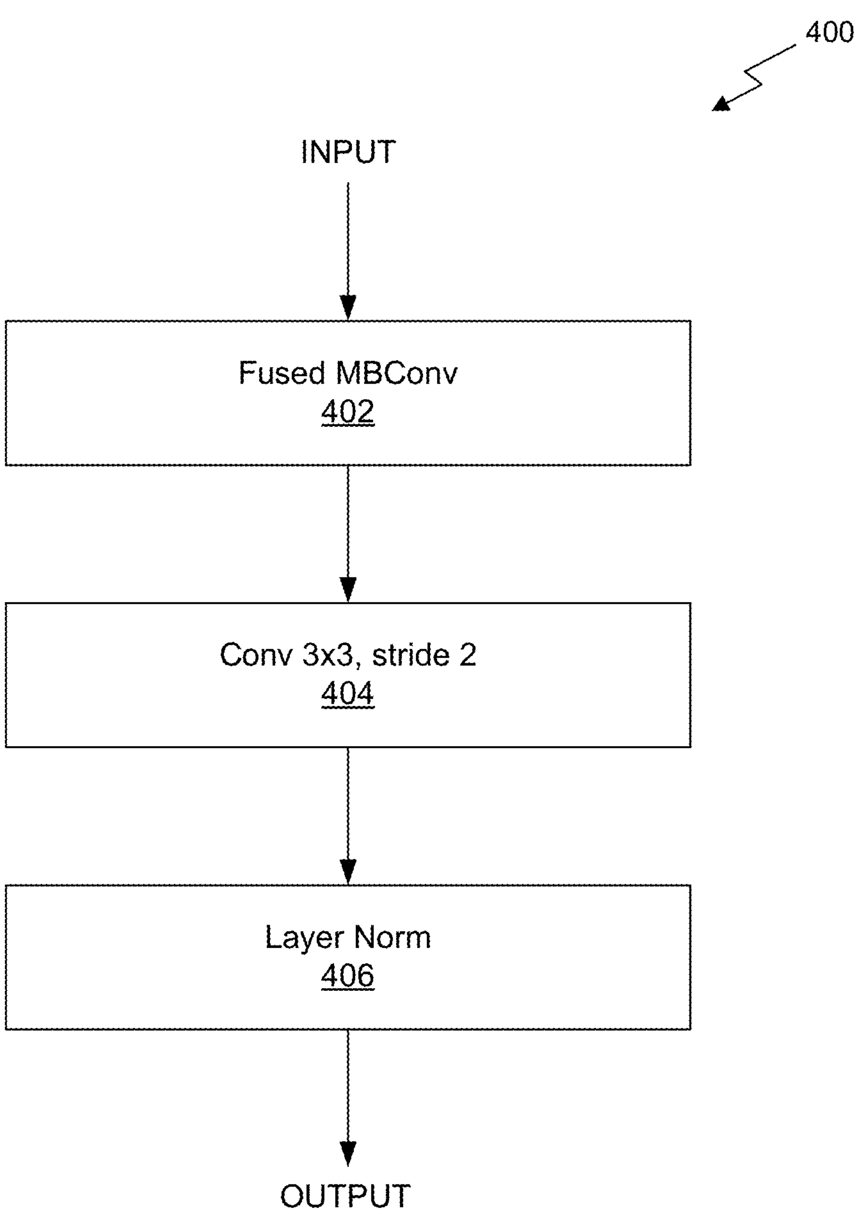
FIG. 4 illustrates a block diagram of a downsampling block of a vision transformer, in accordance with an embodiment.

FIG. 4 illustrates a block diagram of a downsampling block 400 of a vision transformer, in accordance with an embodiment. The downsampling block 400 described herein may be one embodiment of the downsampling block 308A-C of FIG. 3.

The downsampling block 400, providing spatial feature contraction, is modeled from CNN models that impose locality bias and cross channel communication while reducing dimensions. In the present embodiment, the downsampling block 400 includes a modified Fused-MBConv block 402, followed by a max pooling layer 404 with a kernel size of 3 and stride of 2. Components 402 and 404 are used in combination as a downsampling operator. The Fused-MBConv block 402 is configured per the parameters shown in Table 1.

TABLE 1

| |
|---|
| $\hat{x} = DW - Conv_{3\times 3}(x)$, |
| $\hat{x} = GELU(\hat{x})$, |
| $\hat{x} = SE(\hat{x})$, |
| $x = Conv_{1\times 1}(\hat{x}) + x$, |
| where SE, GELU, and $DW - Conv_{3x3}$ |
| denote Squeeze and Excitation block, |
| Guassian Error Linear Unit, and $3 \times 3$ |
| depth-wise convolution, respectively. |

In the present embodiment, Fused-MBConv block 402 provides desirable properties such as inductive bias and modeling of inter-channel dependencies. The downsampling block 400 further includes a layer normalization block 406 which normalizes the output of the max pooling layer 404.

Figure 5A:
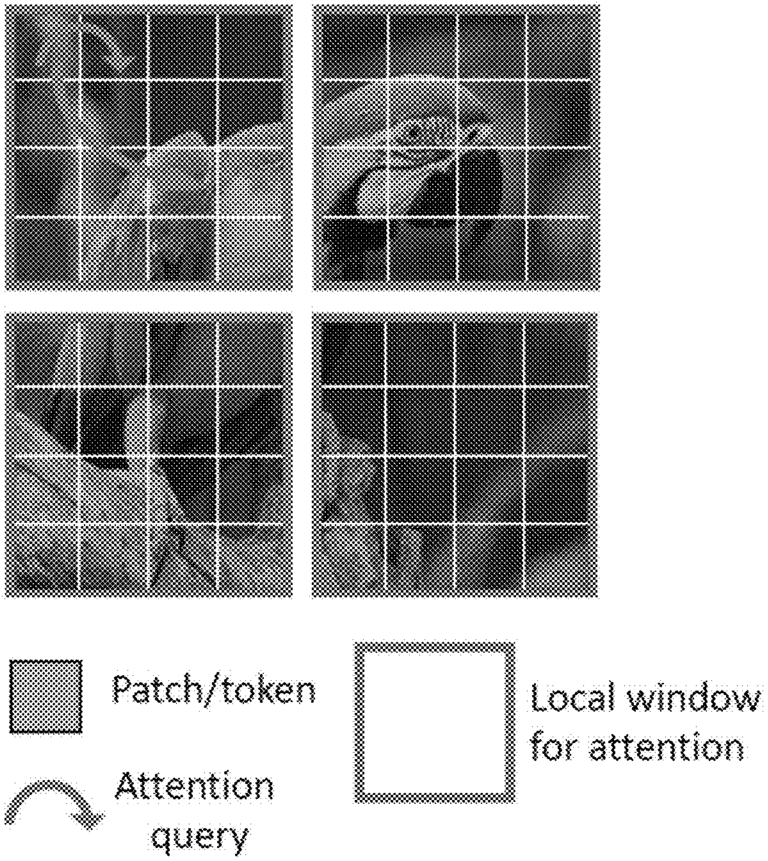
FIG. 5A illustrates an exemplary image in which local attention is computed, in accordance with an embodiment.

FIG. 5A illustrates an exemplary image in which local attention is computed, in accordance an embodiment. FIG. 5A may illustrate an exemplary implementation of the local self-attention module of FIGS. 2 and/or 3, in an embodiment.

As described above, an image is split into a plurality of local windows, within which local self-attention can then be computed. This leads to linear complexity scaling with image size. As shown, local self-attention is computed on feature patches within the same local window only. The local self-attention extracts local, short-range, information.

Figure 5B:
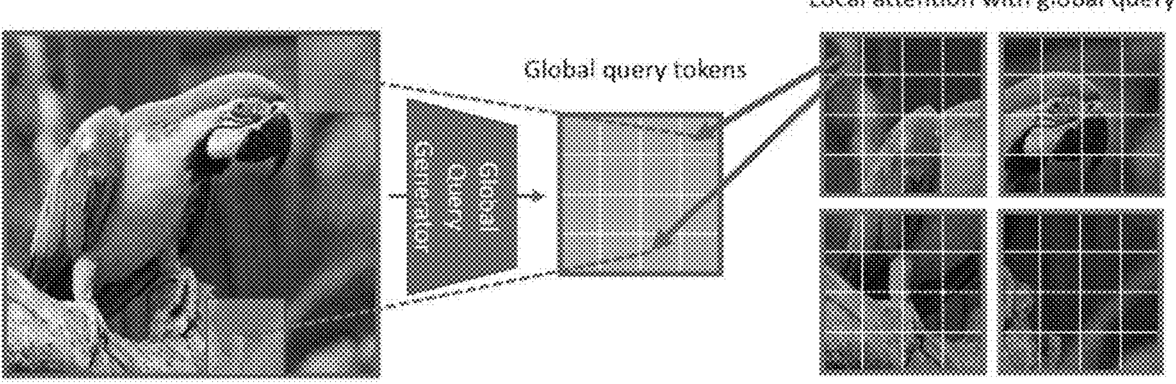
FIG. 5B illustrates an exemplary image in which global attention is computed jointly with local attention, in accordance with an embodiment.

FIG. 5B illustrates an exemplary image in which global attention is computed jointly with local attention, in accordance with an embodiment. FIG. 5B may illustrate an exemplary implementation of the global self-attention module of FIGS. 2 and/or 3, in an embodiment.

Similar to FIG. 5A, an image is split into a plurality of local windows. However, in order to facilitate long range dependencies, FIG. 5B illustrates how global self-attention is computed to allow cross-patch communication with those patches far beyond the local window. Global self-attention attends other regions (outside the local window) in the image via a global query token that represents an image embedding extracted with CNN-like module. As shown, the global features are extracted from the entire input features, and then are repeated to form global query tokens. The global query token is interacted with local key and value tokens (per local window), hence allowing the capture of long-range information via cross-region interaction.

Figure 6:
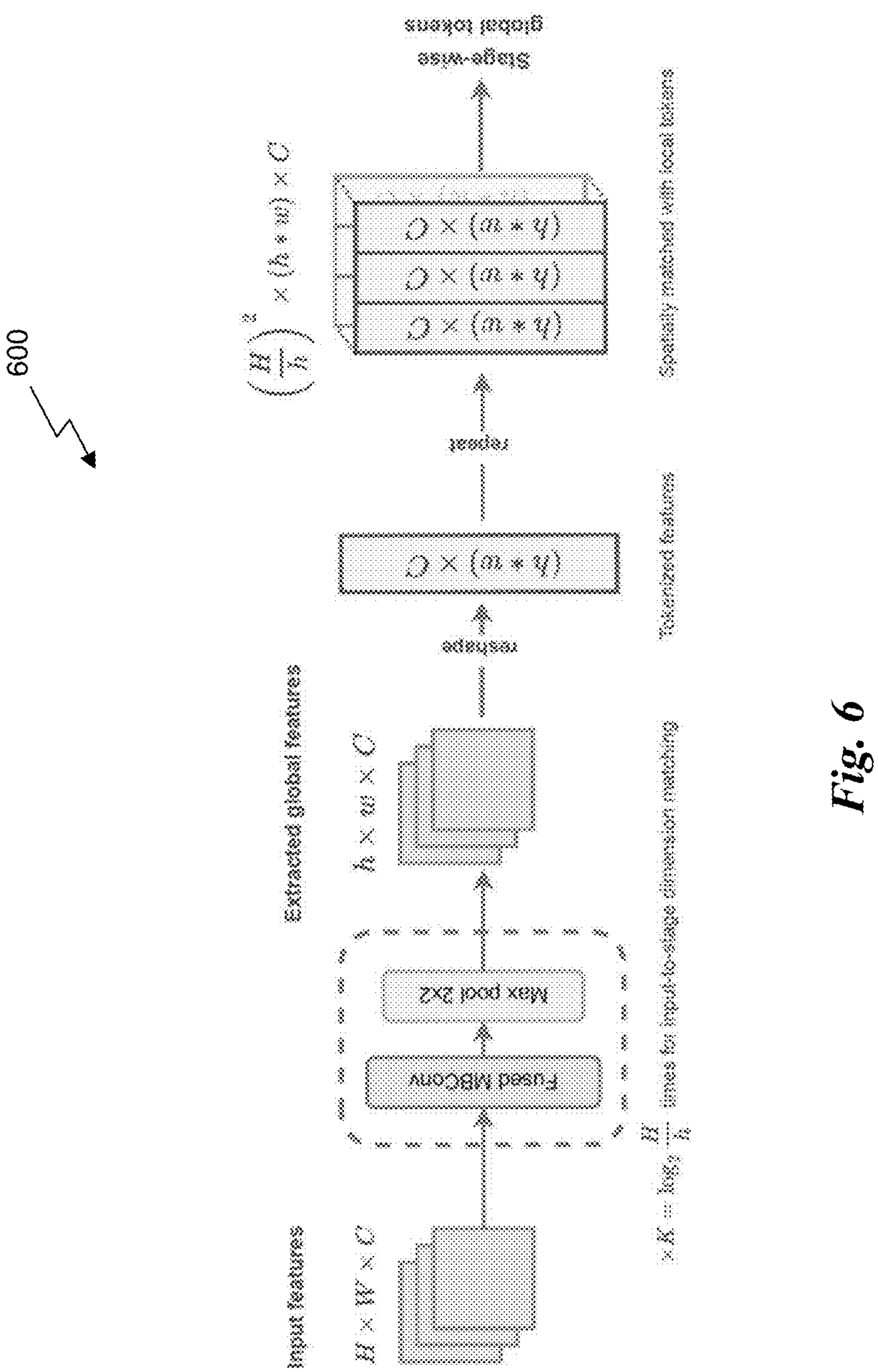
FIG. 6 illustrates a block diagram of the operation of a global token generator, in accordance with an embodiment.

FIG. 6 illustrates a block diagram of the operation of a global token generator 600, in accordance with an embodiment. The global token generator 600 described herein may be one embodiment of the global token generator 306 of FIG. 3.

The global token generator 600 is designed to (i) transform an input feature map (i.e. for an input image) to a current stage of dimension H, W, C being height, width, and channel respectively, (ii) extract features from the transformed feature map via repeating of the Fused-MBConv block, joint with down-sampling, $$\log_2 \frac{H}{h}$$

times for dimension matching to local window size h, output of which is (iii) reshaped and repeated to $$\left(\frac{H}{h}\right)^2$$

number of local tokens that can now each quickly attend to global information. Note that the star (symbol) shown denotes merged dimensions during reshaping.

The global token generator 600 generates global query tokens that encompass information across the entire input feature map for an input image, for interaction with local key and value features per local window when computing global self-attention. Specifically, as shown, a layer in the global token generator 600 consists of a Fused-MBConv block followed by a max pooling layer, similar to the one described above with respect to the downsampling block of FIG. 4. The final global query $q_{g,i}$ at stage i ($i \in \{1, 2, 3, 4\}$) of the vision transformer is computed according to the parameters shown in Table 2.

TABLE 2

| |
|---|
| $x^i = F\text{-}MBConv(X^{i-1})$, |
| $x^i = MaxPool(x^i)$ |

These query tokens are computed once at every stage of the vision transformer and shared across all global self-attention modules, hence decreasing a number of parameters and FLOPs and improving the generalizability of the vision transformer. In addition, the global self-attention modules only learn local key and value features which will be used for interaction with the global query tokens.

Figure 7A:
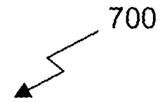
FIG. 7A illustrates a block diagram of a local self-attention module of a vision transformer, in accordance with an embodiment.
Figure 7A:
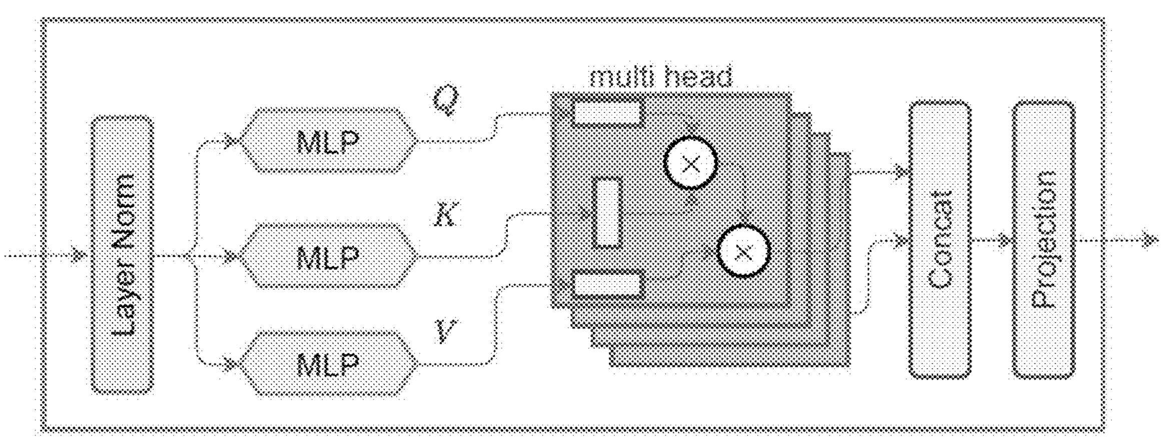

FIG. 7A illustrates a block diagram of a local self-attention module 700 of a vision transformer, in accordance with an embodiment. The local self-attention module 700 described herein may be one embodiment of the local self-attention module included in each processing stage 304A-D of FIG. 3.

The local self-attention module 700 can only query patches within a local window. In particular, as shown, the local self-attention module 700 computes query (Q), key (K), and value (V) tokens (e.g. vectors, features), per local window. Multi-head attention is employed and the outputs are then concatenated and projected into the expected dimension.

Figure 7B:
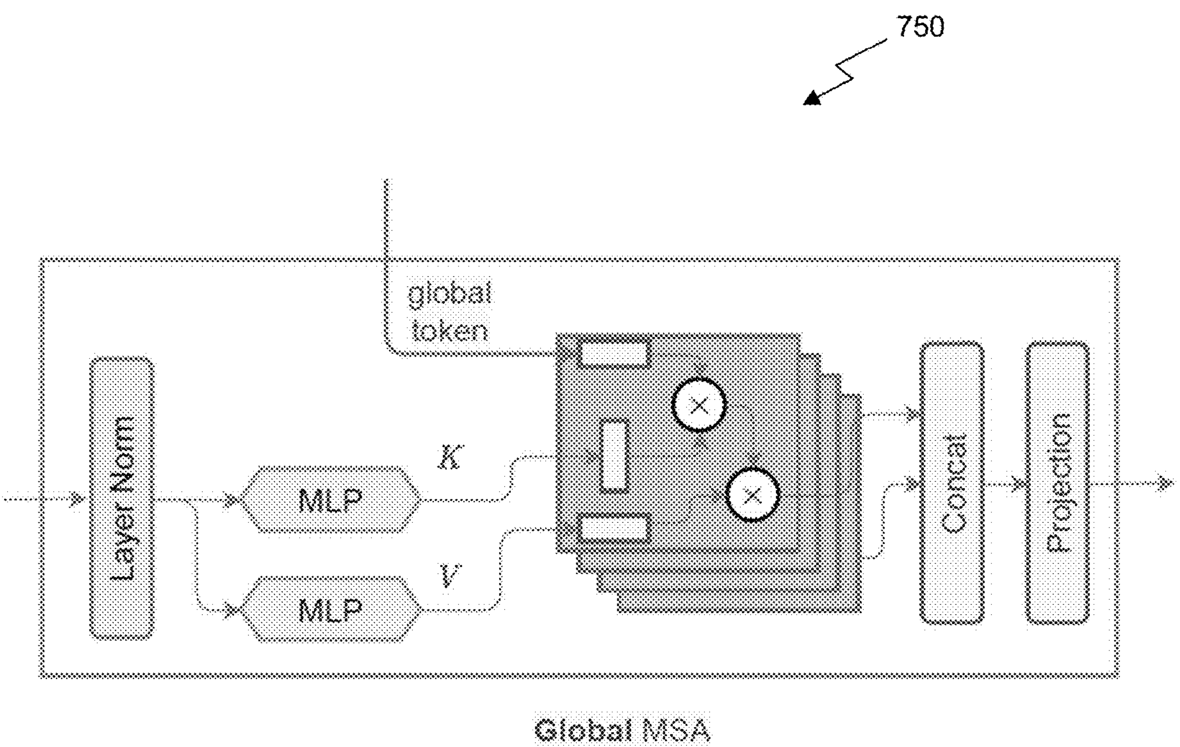
FIG. 7B illustrates a block diagram of a global self-attention module of a vision transformer, in accordance with an embodiment.

FIG. 7B illustrates a block diagram of a global self-attention module 750 of a vision transformer, in accordance with an embodiment. The global self-attention module 750 described herein may be one embodiment of the global self-attention module included in each processing stage 304A-D of FIG. 3.

The global self-attention module 750 can query an image globally while still operating in a local window. As shown, global self-attention module 750 does not compute the query vector, and instead reuses the global query token computed via a global token generator (an embodiment of which is illustrated in FIG. 6).

The only difference in implementation between the local self-attention module 700 of FIG. 7A and the global self-attention module 750 of FIG. 7B is that the query token is pre-computed for the global self-attention module 750. In each processing stage, the vision transformer employs alternating local self-attention module 700 and global self-attention module 750 to effectively capture both local and global spatial information. The global self-attention module 700 utilizes global query tokens (e.g. obtained according to the equation shown in Table 2 above and shared across the global self-attention modules 750 of all processing stages, to interact with extracted local key and value tokens.

In an embodiment, the global attention query $q_g$ has a size of B×C×h×w, wherein B, C, h and w denote batch size, embedding dimension, local window height, and local window width, respectively. Moreover, $q_g$ is repeated along the batch dimension to compensate for the overall number of windows and batch size B*=B×N where N is the number of local windows. $q_g$ is further reshaped into multiple head. The value and key are computed within each local window using a linear layer. The global self-attention query, key and value tokens may be computed as in the equations shown in Table 3.

TABLE 3

$$Q_g \in \mathbb{R}^{B*\times C\times h\times w} := [q_g, \ldots, q_g],\ q_g \in \mathbb{R}^{B\times C\times h\times w},$$
$$q_g \in \mathbb{R}^{B*\times N\times C} \xleftarrow{\text{reshape}} Q_g \in \mathbb{R}^{B*\times C\times h\times w},$$
$$k, v = g(x) \in \mathbb{R}^{B*\times N\times C}.$$

Since the partitioned windows only contain local information, interaction with rich contextual information embedded in the global query tokens provides an effective way of enlarging the receptive field and attending to various regions in the input feature maps. The self-attention module is computed using the equation shown in Table 4.

TABLE 4

$$\text{Attention}(q_g, k, v) = \text{Softmax}\left(\frac{q_g k}{\sqrt{d}} + \right)v,$$

where d is a scaling factor and b is a learnable relative position bias term.

Assuming position change between [−p+1, p−1] along horizontal and vertical axes, b is sampled from the grid $\hat{b} \in \mathbb{R}^{(2p-1)\times(2p-1)}$. Relative position bias improves the performance, in an embodiment, especially for dense prediction downstream tasks. Table 5 presents PyTorch-like pseudocode for computing global self-attention.

TABLE 5

```
# Input/output shape: (B*, N, C)
# B*: Batchsize*Num Windows; H: Height;
# W: Width; C: dim; q_g: Global Token;
# F: Num Attention Head; N: Num Windows;
def init( ):
  f = nn.Linear(C, 2*C)
  softmax = nn.Softmax(dim=−1)
def forward(x, q_g):
  B*, N, C = x.shape
  B, C, h, w = q_global.shape
```

TABLE 5-continued

```
  kv = f(x).reshape(B*, N, 2, F, C // F)
  kv = kv.permute(2, 0, 3, 1, 4)
  k, v = split(kv, (1, 1), 0)
  q_g = q_g.repeat(B* // B, 1, 1, 1)
  q_g = q_g.reshape(B*, F, N, C // F)
  qk = matmul(q_g,k.transpose(−2, −1))
  attn = softmax(qk)
  return matmul(attn, v).reshape(B*, N, C)
```

Figure 8:
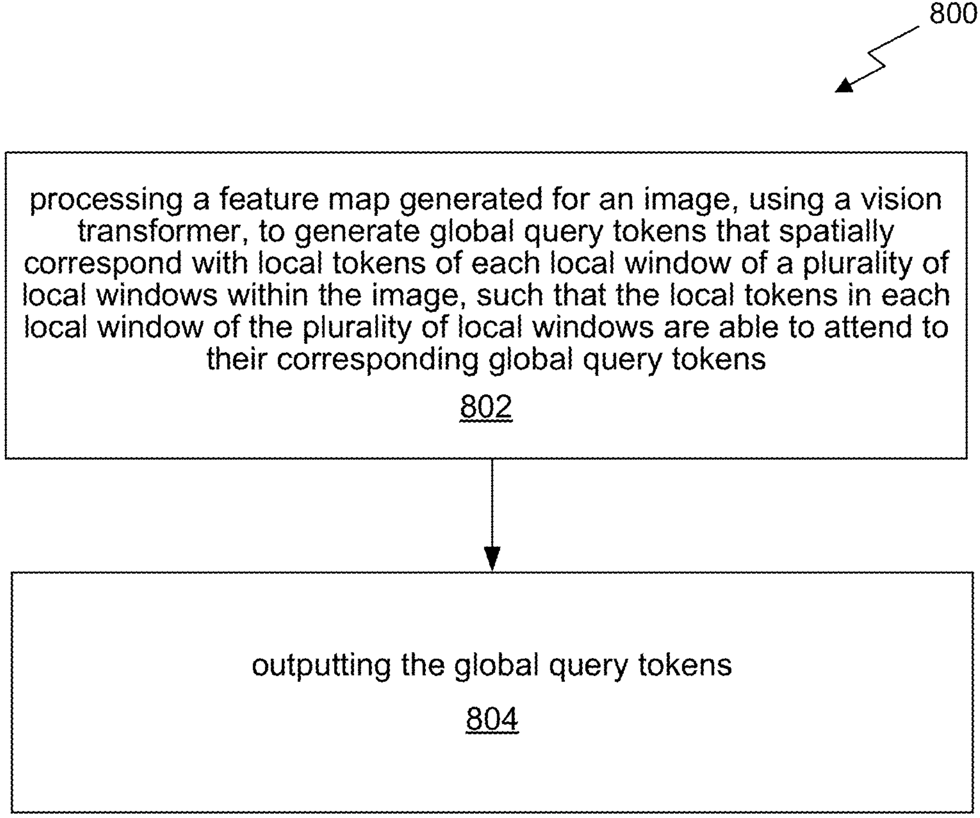
FIG. 8 illustrates a flowchart of a method for generating global query tokens for use in providing global context with a vision transformer, in accordance with an embodiment.

FIG. 8 illustrates a flowchart of a method 800 for generating global query tokens for use in providing global context with a vision transformer, in accordance with an embodiment. The method 800 may be performed by a device comprised of a processing unit, a program, custom circuitry, or a combination thereof. The method 300 may be carried out by the vision transformer described above with reference to FIG. 1, including, for example, by a global token generator such as that described in FIG. 6.

In operation 802, a feature map generated for an image is processed, using a vision transformer, to generate global query tokens that spatially correspond with local tokens of each local window of a plurality of local windows within the image, such that the local tokens in each local window of the plurality of local windows are able to attend to their corresponding global query tokens (e.g. via processing by a global self-attention module).

With respect to the present description, a feature map refers to a map generated by applying filters or feature detectors to an input image. The feature map indicates where a certain type of feature is located within the image. The feature may be accessed from a storage location (e.g. memory), or may otherwise be received as input, for the processing thereof.

By processing the feature map generated for an entirety of the image, the global query tokens are generated for the entirety of the image but in a manner such that they spatially correspond with local tokens. This allows the global query tokens to be attended to by the local tokens (key and value) per local window of the image. In an embodiment, attending to the global query tokens allows for long-range (global) dependencies to be modeled in the features output by the vision transformer.

In an embodiment, the feature map is processed by transforming the feature map to a particular dimension (e.g. per stage of the vision transformer, as described in more detail below). In an embodiment, the feature map is processed by extracting features therefrom. In an embodiment, the features are processed for dimension matching to a local window size. In an embodiment, the features are reshaped to form tokenized features that are then repeated (as the global query tokens) to a number of local tokens that can then attend to the global tokens.

In operation 804, the global query tokens are output. In an embodiment, the global query tokens are output to a global self-attention module of the vision transformer. In an embodiment, the global self-attention module computes global self-attention per local window of the image, using the global query tokens and locally computed key and value tokens.

In an embodiment, the vision transformer includes a sequence of stages of sequentially reduced dimension, each composed of a local self-attention module and the global self-attention module. In an embodiment, the global query tokens are generated (per operation 802) only once per stage in the sequence of stages.

Machine Learning

Deep neural networks (DNNs), also referred to herein as neural networks and including deep learning models which have been developed on processors, have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions. Inferencing is less compute-intensive than training, being a latency-sensitive process where a trained neural network is applied to new inputs it has not seen before to classify images, translate speech, and generally infer new information.

Inference and Training Logic

Figure 9A:
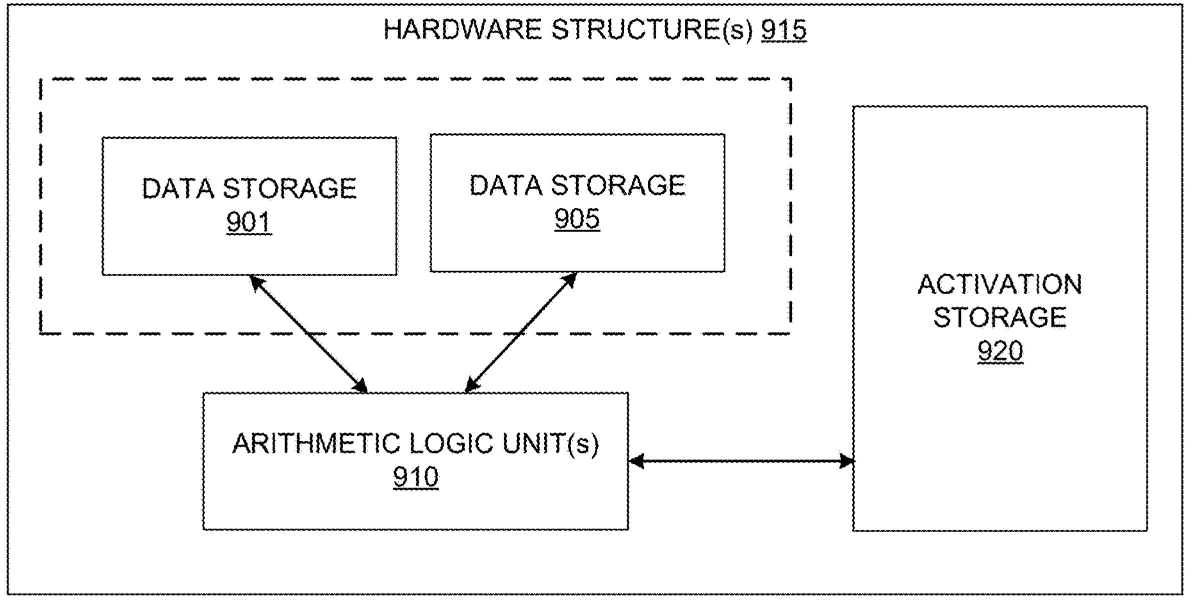
FIG. 9A illustrates inference and/or training logic, according to at least one embodiment.

As noted above, a deep learning or neural learning system needs to be trained to generate inferences from input data. Details regarding inference and/or training logic 915 for a deep learning or neural learning system are provided below in conjunction with FIGS. 9A and/or 9B.

In at least one embodiment, inference and/or training logic 915 may include, without limitation, a data storage 901 to store forward and/or output weight and/or input/output data corresponding to neurons or layers of a neural network trained and/or used for inferencing in aspects of one or more embodiments. In at least one embodiment data storage 901 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage 901 may be included with other on-chip or off-chip data storage, including a processor's L1, L2, or L3 cache or system memory.

In at least one embodiment, any portion of data storage 901 may be internal or external to one or more processors or other hardware logic devices or circuits. In at least one embodiment, data storage 901 may be cache memory, dynamic randomly addressable memory ("DRAM"), static randomly addressable memory ("SRAM"), non-volatile memory (e.g., Flash memory), or other storage. In at least one embodiment, choice of whether data storage 901 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 915 may include, without limitation, a data storage 905 to store backward and/or output weight and/or input/output data corresponding to neurons or layers of a neural network trained and/or used for inferencing in aspects of one or more embodiments. In at least one embodiment, data storage 905 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, any portion of data storage 905 may be included with other on-chip or off-chip data storage, including a processor's L1, L2, or L3 cache or system memory. In at least one embodiment, any portion of data storage 905 may be internal or external to on one or more processors or other hardware logic devices or circuits. In at least one embodiment, data storage 905 may be cache memory, DRAM, SRAM, non-volatile memory (e.g., Flash memory), or other storage. In at least one embodiment, choice of whether data storage 905 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage 901 and data storage 905 may be separate storage structures. In at least one embodiment, data storage 901 and data storage 905 may be same storage structure. In at least one embodiment, data storage 901 and data storage 905 may be partially same storage structure and partially separate storage structures. In at least one embodiment, any portion of data storage 901 and data storage 905 may be included with other on-chip or off-chip data storage, including a processor's L1, L2, or L3 cache or system memory.

In at least one embodiment, inference and/or training logic 915 may include, without limitation, one or more arithmetic logic unit(s) ("ALU(s)") 910 to perform logical and/or mathematical operations based, at least in part on, or indicated by, training and/or inference code, result of which may result in activations (e.g., output values from layers or neurons within a neural network) stored in an activation storage 920 that are functions of input/output and/or weight parameter data stored in data storage 901 and/or data storage 905. In at least one embodiment, activations stored in activation storage 920 are generated according to linear algebraic and or matrix-based mathematics performed by ALU(s) 910 in response to performing instructions or other code, wherein weight values stored in data storage 905 and/or data 901 are used as operands along with other values, such as bias values, gradient information, momentum values, or other parameters or hyperparameters, any or all of which may be stored in data storage 905 or data storage 901 or another storage on or off-chip. In at least one embodiment, ALU(s) 910 are included within one or more processors or other hardware logic devices or circuits, whereas in another embodiment, ALU(s) 910 may be external to a processor or other hardware logic device or circuit that uses them (e.g., a co-processor). In at least one embodiment, ALUs 910 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 901, data storage 905, and activation storage 920 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 620 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 920 may be cache memory, DRAM, SRAM, non-volatile memory (e.g., Flash memory), or other storage. In at least one embodiment, activation storage 920 may be completely or partially within or external to one or more processors or other logical circuits. In at least one embodiment, choice of whether activation storage 920 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 915 illustrated in FIG. 9A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 915 illustrated in FIG. 9A may be used in conjunction with central processing unit ("CPU") hardware, graphics processing unit ("GPU") hardware or other hardware, such as field programmable gate arrays ("FPGAs").

Figure 9B:
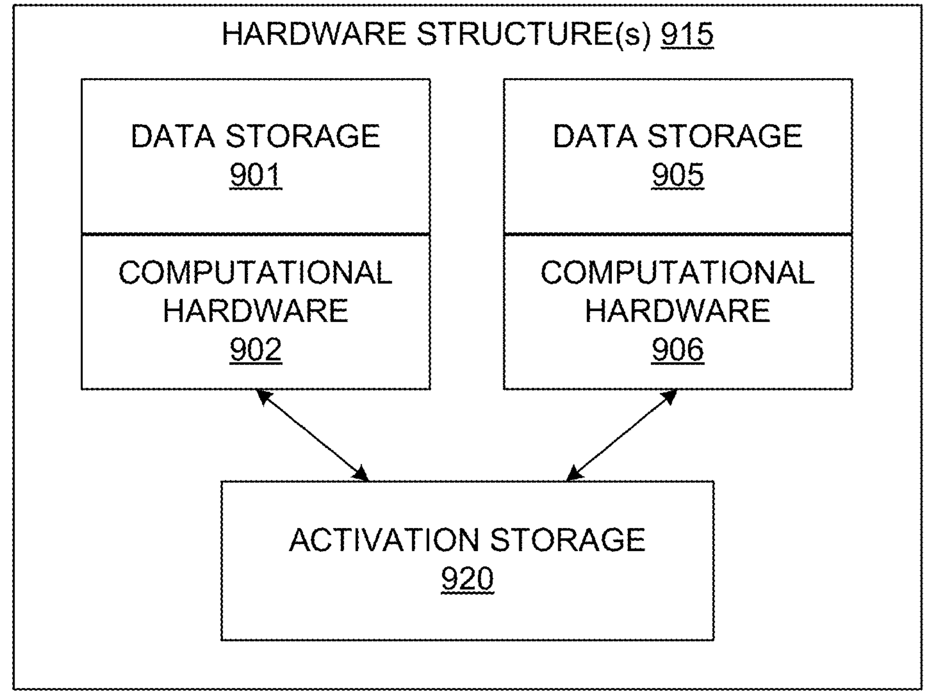
FIG. 9B illustrates inference and/or training logic, according to at least one embodiment.

FIG. 9B illustrates inference and/or training logic 915, according to at least one embodiment. In at least one embodiment, inference and/or training logic 915 may include, without limitation, hardware logic in which computational resources are dedicated or otherwise exclusively used in conjunction with weight values or other information corresponding to one or more layers of neurons within a neural network. In at least one embodiment, inference and/or training logic 915 illustrated in FIG. 9B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 915 illustrated in FIG. 6B may be used in conjunction with central processing unit (CPU) hardware, graphics processing unit (GPU) hardware or other hardware, such as field programmable gate arrays (FPGAs). In at least one embodiment, inference and/or training logic 915 includes, without limitation, data storage 901 and data storage 905, which may be used to store weight values and/or other information, including bias values, gradient information, momentum values, and/or other parameter or hyperparameter information. In at least one embodiment illustrated in FIG. 9B, each of data storage 901 and data storage 905 is associated with a dedicated computational resource, such as computational hardware 902 and computational hardware 906, respectively. In at least one embodiment, each of computational hardware 906 comprises one or more ALUs that perform mathematical functions, such as linear algebraic functions, only on information stored in data storage 901 and data storage 905, respectively, result of which is stored in activation storage 920.

In at least one embodiment, each of data storage 901 and 905 and corresponding computational hardware 902 and 906, respectively, correspond to different layers of a neural network, such that resulting activation from one "storage/computational pair 901/902" of data storage 901 and computational hardware 902 is provided as an input to next "storage/computational pair 905/906" of data storage 905 and computational hardware 906, in order to mirror conceptual organization of a neural network. In at least one embodiment, each of storage/computational pairs 901/902 and 905/906 may correspond to more than one neural network layer. In at least one embodiment, additional storage/computation pairs (not shown) subsequent to or in parallel with storage computation pairs 901/902 and 905/906 may be included in inference and/or training logic 915.

Neural Network Training and Development

Figure 10:
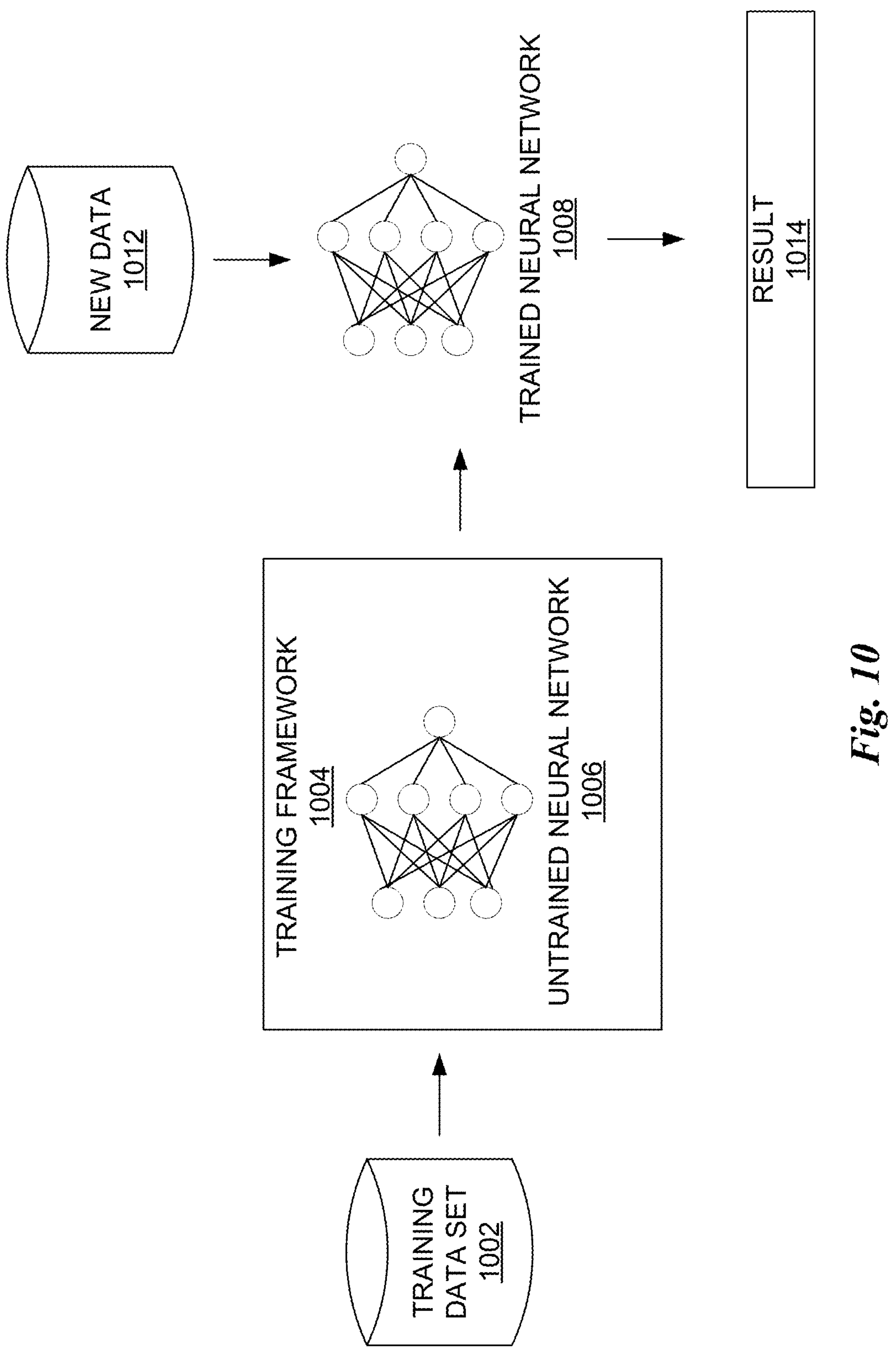
FIG. 10 illustrates training and deployment of a neural network, according to at least one embodiment.

FIG. 10 illustrates another embodiment for training and deployment of a deep neural network. In at least one embodiment, untrained neural network 1006 is trained using a training dataset 1002. In at least one embodiment, training framework 1004 is a PyTorch framework, whereas in other embodiments, training framework 1004 is a Tensorflow, Boost, Caffe, Microsoft Cognitive Toolkit/CNTK, MXNet, Chainer, Keras, Deeplearning4j, or other training framework. In at least one embodiment training framework 1004 trains an untrained neural network 1006 and enables it to be trained using processing resources described herein to generate a trained neural network 1008. In at least one embodiment, weights may be chosen randomly or by pre-training using a deep belief network. In at least one embodiment, training may be performed in either a supervised, partially supervised, or unsupervised manner.

In at least one embodiment, untrained neural network 1006 is trained using supervised learning, wherein training dataset 1002 includes an input paired with a desired output for an input, or where training dataset 1002 includes input having known output and the output of the neural network is manually graded. In at least one embodiment, untrained neural network 1006 is trained in a supervised manner processes inputs from training dataset 1002 and compares resulting outputs against a set of expected or desired outputs. In at least one embodiment, errors are then propagated back through untrained neural network 1006. In at least one embodiment, training framework 1004 adjusts weights that control untrained neural network 1006. In at least one embodiment, training framework 1004 includes tools to monitor how well untrained neural network 1006 is converging towards a model, such as trained neural network 1008, suitable to generating correct answers, such as in result 1014, based on known input data, such as new data 1012. In at least one embodiment, training framework 1004 trains untrained neural network 1006 repeatedly while adjust weights to refine an output of untrained neural network 1006 using a loss function and adjustment algorithm, such as stochastic gradient descent. In at least one embodiment, training framework 1004 trains untrained neural network 1006 until untrained neural network 1006 achieves a desired accuracy. In at least one embodiment, trained neural network 1008 can then be deployed to implement any number of machine learning operations.

In at least one embodiment, untrained neural network 1006 is trained using unsupervised learning, wherein untrained neural network 1006 attempts to train itself using unlabeled data. In at least one embodiment, unsupervised learning training dataset 1002 will include input data without any associated output data or "ground truth" data. In at least one embodiment, untrained neural network 1006 can learn groupings within training dataset 1002 and can determine how individual inputs are related to untrained dataset 1002. In at least one embodiment, unsupervised training can be used to generate a self-organizing map, which is a type of trained neural network 1008 capable of performing operations useful in reducing dimensionality of new data 1012. In at least one embodiment, unsupervised training can also be used to perform anomaly detection, which allows identification of data points in a new dataset 1012 that deviate from normal patterns of new dataset 1012.

In at least one embodiment, semi-supervised learning may be used, which is a technique in which in training dataset 1002 includes a mix of labeled and unlabeled data. In at least one embodiment, training framework 1004 may be used to perform incremental learning, such as through transferred learning techniques. In at least one embodiment, incremental learning enables trained neural network 1008 to adapt to new data 1012 without forgetting knowledge instilled within network during initial training.

Data Center

Figure 11:
FIG. 11 illustrates an example data center system, according to at least one embodiment.
Figure 11:
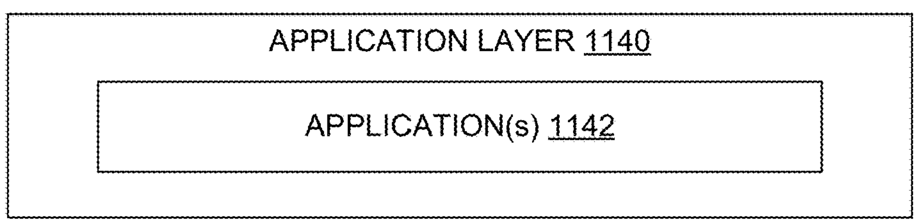
Figure 11:
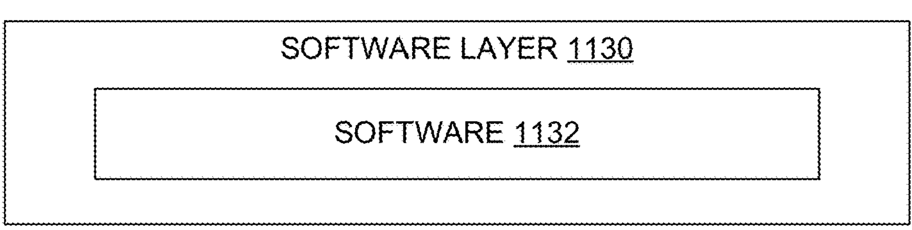
Figure 11:
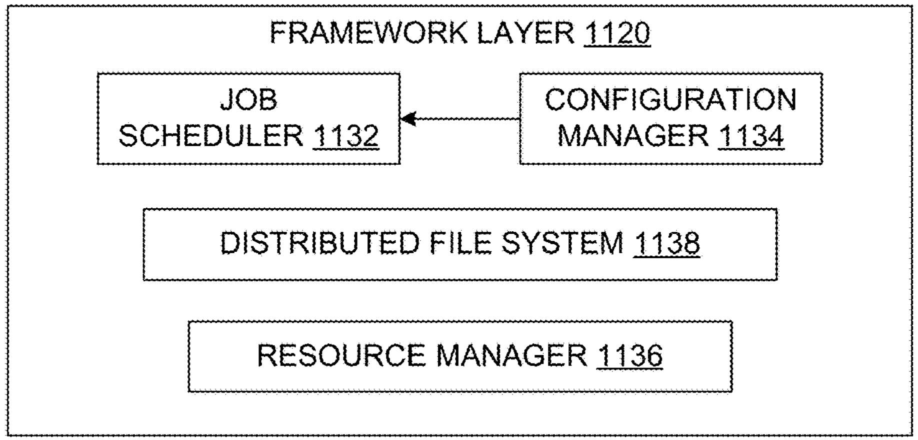
Figure 11:
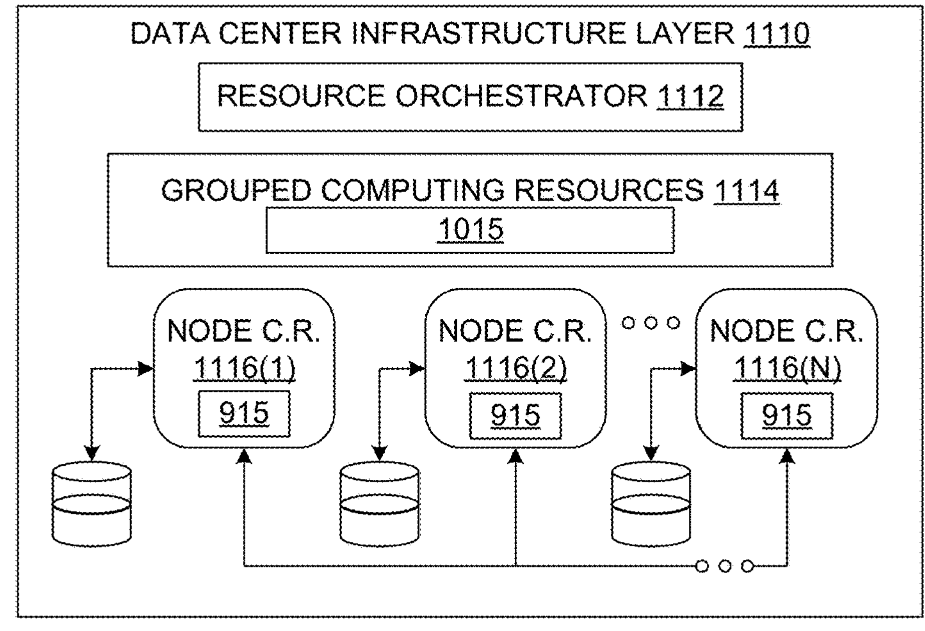

FIG. 11 illustrates an example data center 1100, in which at least one embodiment may be used. In at least one embodiment, data center 1100 includes a data center infrastructure layer 1110, a framework layer 1120, a software layer 1130 and an application layer 1140.

In at least one embodiment, as shown in FIG. 11, data center infrastructure layer 1110 may include a resource orchestrator 1112, grouped computing resources 1114, and node computing resources ("node C.R.s") 1116(1)-1116(N), where "N" represents any whole, positive integer. In at least one embodiment, node C.R.s 1116(1)-1116(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1116(1)-1116(N) may be a server having one or more of above-mentioned computing resources.

In at least one embodiment, grouped computing resources 1114 may include separate groupings of node C.R.s housed within one or more racks (not shown), or many racks housed in data centers at various geographical locations (also not shown). Separate groupings of node C.R.s within grouped computing resources 1114 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1122 may configure or otherwise control one or more node C.R.s 1116(1)-1116(N) and/or grouped computing resources 1114. In at least one embodiment, resource orchestrator 1122 may include a software design infrastructure ("SDI") management entity for data center 1100. In at least one embodiment, resource orchestrator may include hardware, software or some combination thereof.

In at least one embodiment, as shown in FIG. 11, framework layer 1120 includes a job scheduler 1132, a configuration manager 1134, a resource manager 1136 and a distributed file system 1138. In at least one embodiment, framework layer 1120 may include a framework to support software 1132 of software layer 1130 and/or one or more application(s) 1142 of application layer 1140. In at least one embodiment, software 1132 or application(s) 1142 may respectively include web-based service software or applications, such as those provided by Amazon Web Services, Google Cloud and Microsoft Azure. In at least one embodiment, framework layer 1120 may be, but is not limited to, a type of free and open-source software web application framework such as Apache Spark™ (hereinafter "Spark") that may utilize distributed file system 1138 for large-scale data processing (e.g., "big data"). In at least one embodiment, job scheduler 1132 may include a Spark driver to facilitate scheduling of workloads supported by various layers of data center 1100. In at least one embodiment, configuration manager 1134 may be capable of configuring different layers such as software layer 1130 and framework layer 1120 including Spark and distributed file system 1138 for supporting large-scale data processing. In at least one embodiment, resource manager 1136 may be capable of managing clustered or grouped computing resources mapped to or allocated for support of distributed file system 1138 and job scheduler 1132. In at least one embodiment, clustered or grouped computing resources may include grouped computing resource 1114 at data center infrastructure layer 1110. In at least one embodiment, resource manager 1136 may coordinate with resource orchestrator 1112 to manage these mapped or allocated computing resources.

In at least one embodiment, software 1132 included in software layer 1130 may include software used by at least portions of node C.R.s 1116(1)-1116(N), grouped computing resources 1114, and/or distributed file system 1138 of framework layer 1120. one or more types of software may include, but are not limited to, Internet web page search software, e-mail virus scan software, database software, and streaming video content software.

In at least one embodiment, application(s) 1142 included in application layer 1140 may include one or more types of applications used by at least portions of node C.R.s 1116 (1)-1116(N), grouped computing resources 1114, and/or distributed file system 1138 of framework layer 1120. one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1134, resource manager 1136, and resource orchestrator 1112 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underutilized and/or poor performing portions of a data center.

In at least one embodiment, data center 1100 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1100. In at least one embodiment, trained machine learning models corresponding to one or more neural networks may be used to infer or predict information using resources described above with respect to data center 1100 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 915 are used to perform inferencing and/or training operations associated with one or more embodiments. In at least one embodiment, inference and/or training logic 915 may be used in system FIG. 11 for inferencing or predicting operations based, at least in part, on weight parameters calculated using neural network training operations, neural network functions and/or architectures, or neural network use cases described herein.

As described herein, a method, computer readable medium, and system are disclosed for providing global context in a vision transformer. In accordance with FIGS. 1A-8, an embodiment may use a vision transformer to obtain feature representations for the input image, and the vision transformer may be stored (partially or wholly) in one or both of data storage 901 and 905. Deployment of the vision transformer may be performed as depicted in FIG. 10 and described herein. Distribution of the vision transformer may be performed using one or more servers in a data center 1100 as depicted in FIG. 11 and described herein.

What is claimed is:

1. A method, comprising:

at a device:

processing an input image through at least one stage of a vision transformer to obtain feature representations for the input image, each stage in the at least one stage including:

a global token generator that, only once during the stage, extracts global features from the input image and generates from the global features repeating global query tokens to spatially match with local tokens of each local window of a plurality of local windows within the input image such that each of the repeating global query tokens corresponds with a different one of the local tokens, a global self-attention module that uses the repeating global query tokens to compute global-self attention for each local window of the plurality of local windows within the input image, and a local self-attention module that computes local-self attention for each local window of the plurality of local windows; and outputting the feature representations.

2. The method of claim 1, wherein the input image is apportioned into the plurality of local windows.

3. The method of claim 1, wherein for each local window of the plurality of local windows, the plurality of image patches within the local window overlap.

4. The method of claim 1, wherein the local self-attention module computes local query, key, and value tokens for each image patch of the plurality of image patches within the local window, and wherein the local interactions are captured using computations applied to the local query, key, and value tokens.

5. The method of claim 1, wherein the global features are extracted from an entirety of the input image.

6. The method of claim 1, wherein a global features are extracted from a feature map created for an entirety of the input image.

7. The method of claim 1, wherein each stage of the at least one stage of the vision transformer computes local and global self-attention, per local window of the plurality of local windows.

8. The method of claim 1, wherein a spatial resolution is decreased after one or more stages in the at least one stage.

9. The method of claim 8, wherein the spatial resolution is decreased by a downsampling block of the vision transformer.

10. The method of claim 9, wherein the downsampling block includes a Fused-MBConv block that provides inductive bias and modeling of inter-channel dependencies when decreasing the spatial resolution.

11. The method of claim 1, wherein the feature representations are output as embeddings for the input image.

12. The method of claim 11, wherein the feature representations are output to one or more further processing blocks of the vision transformer to create the embeddings.

13. The method of claim 12, wherein the further processing blocks include average pooling and linear layers.

14. The method of claim 1, wherein the feature representations are output to a computer vision-related downstream task.

15. The method of claim 14, wherein the computer vision-related downstream task performs one of:

image classification,
object detection,
instance segmentation, or
semantic segmentation.

16. The method of claim 1, wherein the input image is processed through a plurality of stages, and wherein each stage in the plurality of stages includes the global token generator, the global self-attention module and the local self-attention module.

17. The method of claim 16, wherein the plurality of stages are sequential.

18. A non-transitory computer-readable media storing computer instructions which when executed by one or more processors of a device cause the device to:

process an input image through at least one stage of a vision transformer to obtain feature representations for the input image, each stage in the at least one stage including:

a global token generator that, only once during the stage, extracts global features from the input image and generates from the global features repeating global query tokens to spatially match with local tokens of each local window of a plurality of local windows within the input image such that each of the repeating global query tokens corresponds with a different one of the local tokens, a global self-attention module that uses the repeating global query tokens to compute global-self attention for each local window of the plurality of local windows within the input image, and a local self-attention module that computes local-self attention for each local window of the plurality of local windows; and output the feature representations.

19. A system, comprising:

a non-transitory memory storage of a receiving device comprising instructions; and one or more processors of the receiving device in communication with the memory, wherein the one or more processors execute the instructions to:

process an input image through at least one stage of a vision transformer to obtain feature representations for the input image, each stage in the at least one stage including:

a global token generator that, only once during the stage, extracts global features from the input image and generates from the global features repeating global query tokens to spatially match with local tokens of each local window of a plurality of local windows within the input image such that each of the repeating global query tokens corresponds with a different one of the local tokens, a global self-attention module that uses the repeating global query tokens to compute global-self attention for each local window of the plurality of local windows within the input image, and a local self-attention module that computes local-self attention for each local window of the plurality of local windows; and output the feature representations.

20. A method, comprising:

at a device:

processing an input image through at least one stage of a vision transformer to obtain feature representations for the input image, each stage in the at least one stage including:

a global token generator that, only once during the stage, extracts global features from the input image and generates from the global features repeating global query tokens to spatially match with local tokens of each local window of a plurality of local windows within the input image such that each of the repeating global query tokens corresponds with a different one of the local tokens, a global self-attention module that uses the repeating global query tokens to compute global-self attention for each local window of the plurality of local windows within the input image; and outputting the feature representations.

21. The method of claim 1, wherein the global-self attention is computed for each local window of the plurality of local windows within the input image by computing interaction of each of the repeating global tokens with the corresponding one of the local tokens of the local window.

22. The method of claim 1, wherein the local-self attention is computed for each local window of the plurality of local windows by computing local interaction of the local tokens of the local window.

* * * * *